United States Patent
Parker

Patent Number: 5,864,757
Date of Patent: Jan. 26, 1999

[54] METHODS AND APPARATUS FOR LOCKING COMMUNICATIONS DEVICES

[75] Inventor: John Patrick Parker, Fowlmere, United Kingdom

[73] Assignee: BellSouth Corporation, Atlanta, Ga.

[21] Appl. No.: 570,912

[22] Filed: Dec. 12, 1995

[51] Int. Cl.$^6$ .................................................. H04Q 1/00
[52] U.S. Cl. .................. 455/418; 455/418; 455/419; 455/420; 340/825.31; 340/825.34; 340/825.5
[58] Field of Search .................... 455/419, 418, 455/420, 414, 411, 558, 560, 410; 340/825.3, 825.31, 825.34, 825.5; 380/23

[56] References Cited

U.S. PATENT DOCUMENTS

| | | | |
|---|---|---|---|
| 4,291,197 | 9/1981 | Yonaga | 455/411 |
| 4,736,419 | 4/1988 | Roe | 380/3 |
| 5,068,889 | 11/1991 | Yamashita | 455/411 |
| 5,159,625 | 10/1992 | Zicker | 455/419 |
| 5,297,192 | 3/1994 | Gerszberg | 455/419 |
| 5,457,737 | 10/1995 | Wen | 455/410 |
| 5,600,708 | 2/1997 | Mece et al. | 455/411 |
| 5,602,536 | 2/1997 | Henderson et al. | 340/825.31 |
| 5,603,084 | 2/1997 | Henry, Jr. et al. | 455/419 |

OTHER PUBLICATIONS

"Cellular–Phone Coverage Expands to 35 Countries," *The Wall Street Journal*, p. B9 (Nov. 8, 1995).
"PCS 1900: Tomorrow's Technology—Today," *The North American PCS 1900 Action Group (NPAG)*.

*Primary Examiner*—Dwayne D. Bost
*Assistant Examiner*—Jean A. Gelin
*Attorney, Agent, or Firm*—Dominic J. Chiantera; James L. Ewing, IV; Kilpatrick Stockton LLP

[57] ABSTRACT

An apparatus and method for locking and unlocking mobile telecommunications handsets or other devices is disclosed. Each handset is unactivated at the time of purchase. Other than emergency calls, or account activation, no calls can be made using the handset unless it has been unlocked. The handset is capable of receiving a readable subscriber identity module (SIM) having a network (or other) ID and a codeword, and its operation is to be locked and unlocked with respect to the entity corresponding to the ID on the SIM. Furthermore, the handset includes a processor programmed with a unique equipment identification number and a key. All handsets manufactured as part of a particular batch may include the key, which is burned or otherwise written into a memory area of the handset so that it may not be read without its being destroyed. The handset processor is also programmed to produce a handset-specific key as a function of the equipment identification number and the batch-specific key. Upon activation of the handset, the customer service center associated with the network operator transmits a modifier to the handset. The handset changes its handset-specific key according to the modifier to yield an operator-specific key. The resulting operator-specific key is used in conjunction with the network (or other) ID (from the SIM) to produce a checkword. If the checkword matches the codeword, which is read off the SIM, the handset is unlocked (i.e., enabled) for normal use. Other features of the invention include re-locking the handset according to similar principles, and providing a personal identification number for permanently unlocking the device, so that it can be used with any compatible SIM.

28 Claims, 12 Drawing Sheets

| $K_{batch}$ Mapping of IMEI Bits to $K_{handset}$ Bits ||
|---|---|
| IMEI Bits | $K_{handset} = K_{batch}(\text{IMEI Bits})$ |
| $Bit_0$ | $k_{handset\ 0} = \overline{IMEI_{60}}$ |
| $Bit_1$ | $k_{handset\ 1} = IMEI_0$ |
| ⋮ | ⋮ |
| $Bit_n$ | $k_{handset\ m} = IMEI_1$ |
| ⋮ | ⋮ |
| $Bit_{60}$ | $k_{handset\ 60} = \overline{IMEI_n}$ |

FIG. 7

METHODS AND APPARATUS FOR LOCKING COMMUNICATIONS DEVICES

FIELD OF THE INVENTION

The present invention relates, in general, to the field of telephony and, in particular, to the field of telephone (or other) system security.

BACKGROUND OF THE INVENTION

Wireless telecommunications providers often find it useful in attracting new subscribers to subsidize the prospective subscribers' purchase of a handset. The cost of the handsets, which are complex and sophisticated devices, would otherwise fall to the subscribers. A subsidy lowers the financial barrier to the new subscriber's entry into the domain of wireless communications. Although this is a desirable outcome for new subscribers, for such a proposition to be economically viable for the wireless network operator, it must lead to an assured financial return. The service provider, for example, might seek a guarantee that, for a certain period of time, the subscriber's wireless access would be provided only by the network operator offering the subsidy. In return for subsidizing the handset, the network operator would recoup that expense in the form of subscriber air time during the period of exclusivity.

The question arises, however, as to how a network operator can ensure that a subscriber using one of its subsidized handsets has access only to that network's services. One approach to this problem has been to limit the subscriber's access to services, when using the subsidized handset, to those offered by the particular operator by conditioning the use of the handset on its being "unlocked" only for that service. An example of this type of "locking" mechanism has been developed that is compatible with standards promulgated by Groupe Special Mobile ("GSM"), a European organization responsible for developing wireless telecommunications standards that have been adopted in approximately 60 countries as of the filing of this document. (Throughout this document, GSM and certain terms it has defined are referred to for purposes of illustration only. The implementation of methods and apparatus according to the present invention does not depend upon this standard, but could be used with other telecommunications standards, including those that presently exist or are yet to be developed).

An existing approach to mobile telecommunications handset locking utilizes a subscriber identification module ("SIM") specific to the network operator offering the subsidy. A SIM may take the form of a card incorporating an integrated circuit and memory in which subscriber information including a network identification symbol is stored. In the context of GSM, for one example, the network identification symbol is included as a subset of an International Mobile Subscriber Identification ("IMSI"). An IMSI is a globally unique number, recognizable by the GSM telephone network operators, that has the following 15 decimal digit format:

| 3 digits | 2 digits | 2 digits | 8 digits |
|---|---|---|---|
| XXX<br>MCC | XX<br>MNC | XX<br>HLR ID | XXXXXXXX<br>Rest of MSIN |

As shown, an IMSI includes a 3 digit mobile country code ("MCC"), a 2 digit mobile network code ("MNC"), a 2 digit home location register identification ("HLR ID"), and an eight digit mobile subscriber identification number ("MSIN").

Wireless telephone equipment, on the other hand, is defined by an equipment identification number. Under the GSM system, for example, a handset is uniquely identified by an International Mobile Equipment Identification ("IMEI"). The structure and allocation principles of IMEIs are defined in GSM 03.03—version 3.6.0, published October, 1993. According to that document, an IMEI uniquely identifies a given item of mobile station equipment. The IMEI includes 15 digits, as shown immediately below:

| 6 digits | 2 digits | 6 digits | 1 digit |
|---|---|---|---|
| XXXXXX<br>TAC | XX<br>FAC | XXXXXX<br>SNR | X<br>SP |

The six most significant digits specify a type approval code ("TAC"), the contents of which are determined by a central decision-making body. The two next most significant digits comprise a final assembly code ("FAC"), which identifies the place of manufacture/final assembly of the equipment and is encoded by the manufacturer. The next six digits set forth the serial number of the equipment, uniquely identifying it within each TAC and FAC. Manufacturers are required to allocate individual serial numbers in sequential order. Finally, the MEI includes a spare digit for further assignment.

In addition to permanently programming mobile telephone equipment with an equipment identification number, such as an IMEI, it is also known to permanently encode a mobile telephone handset at the time of manufacture with a code identifying a particular network. This network identification (NID) code (which, under GSM, is the two digit MNC) may be burned into or otherwise coded in a circuit within the handset. Preferably the NID is encoded in the handset in such a manner that it cannot be modified by another without destroying the product. Upon powering up, the handset is locked, and can be unlocked only by inserting the SIM into a receiving and reading slot in the handset. A processor in the handset is programmed to read the IMSI off the SIM, extract the MNC, and compare the MNC with an MNC value stored in the handset. If the NID (e.g., MNC) in the handset is matched by the NID (MNC) extracted from the subscriber information (e.g., IMSI) on the SIM, the handset unlocks itself, enabling the user to make regular telephone calls. A scheme of this sort is in use, for example, in the Orange system and the Mercury One-2-One system in the United Kingdom.

A major shortcoming with the foregoing approach, in which an NID in the handset is compared with one on the SIM, is that the handset must be customized at the time of manufacture for use with only one particular network. This limitation would preclude a service provider from buying handsets in bulk in order to supply them for use with different networks within its system. Compatibility with such entities as resellers of wireless network services would also be inhibited. One proposed solution to this problem is to program the handsets at the time of manufacture with a number of different NIDs. This approach, however, would be insufficiently flexible to account for an operator's establishment or acquisition of a further network, or for an operator's relationship with a reseller or another network operator.

No handset locking system has yet been provided that frees the handset from being locked to a particular end network or other entity at the time of manufacture. It has therefore been impossible to pre-lock wireless handset to SIMs associated with a particular service provider (e.g., one operating multiple networks), a particular network, a particular reseller, or even to lock a handset to a particular individual SIM. Moreover, it is not possible with existing systems to disable locking of individual handsets over the air, and possibly via the key board of the handset, on the occurrence of preselected conditions, such as when an initial subscriber contract period has expired. In addition, the existing approach does not permit the activation of a handset remotely (e.g., over-the-air). Nor does it permit a device to be remotely re-locked (e.g., over-the-air) to a specific operator, network, reseller, or individual SIM. Among other difficulties, these shortcomings impose constraints on the development and availability of wireless telephone services. New alliances between operators or resellers may arise that would make it desirable to permit the locking criteria to be changed, for example, but this is not possible with the existing approach.

An improved mechanism for locking handsets and other devices should be sufficiently robust to prevent individual subscribers from attempting to move their business to a rival operator. It must also withstand attempts at circumvention by criminals or unscrupulous dealers or operators. Furthermore, if the security of an individual handset is compromised, it is critical that the result should not be able to lead to the compromise of other handsets associated with the handset provider.

One of the unmet needs of conventional wireless communications systems is the ability to lock a handset to services provided only by a particular service provider, or to other network operators or resellers with which the particular operator has an agreement. In order to meet this need, it should be possible for handsets to be distributed to such designated service providers by one or more physical distribution centers (PDCs) run by the operator. To maintain security throughout this distribution process, the handsets must be pre-locked to prevent their use by any operator or re-seller other than those that are designated service providers. For convenience and economy, the handsets should be operable without the need to program them at a PDC prior to delivery. Any further steps required for activation of the handset should be capable of being performed remotely, for example, over-the-air, and then only by the operator or one of its designated providers.

SUMMARY OF THE INVENTION

The problems described in the preceding section are solved by the methods and apparatus according to the present invention, which permit a telecommunications handset, or other device, to be electronically locked to a particular service provider, to a particular network, to a particular reseller, or even to an individual SIM. At the same time, the methods and apparatus of the present invention eliminate the limitation that a mobile telecommunications handset, or other device, be locked for all time with respect to only one particular service provider, network, reseller, or other entity determined at the time of manufacture.

Locking according to the present invention is based on the principle that only SIMs produced by the controlling service provider or operator should work with the handset, but that the controlling entity may be changed as necessary or desired. The present invention achieves this goal by employing a key (e.g., an algorithm) specific to the handset for producing, as a function of an identity that is stored in the SIM, a checkword corresponding to a codeword stored in the SIM. The present invention does so in such a manner that the result of applying the key can be modified to correspond to a particular service provider, network, reseller, tariff package, or even to a unique SIM.

In accordance with the present invention, therefore, a method is provided for unlocking a pre-locked device, such as a wireless telecommunications handset or terminal. The device is adapted to receive signals from a remote source (e.g., over-the-air), and is further adapted to receive an identification module, such as a SIM. The identification module contains a first value, which may be an identification code for an entity such as (but not limited to) a service provider. The identification module also contains a second value, which may be a codeword, against which the device will compare a computed result to determine whether it may unlock itself. The method according to the present invention, briefly, includes the first step of computing a key as a function of a signal received from a remote location (which may be transmitted by the entity identified in the first identification module value). A checkword is computed as a function of the computed key, as well as the first identification module value. Finally, the computed checkword is compared with the second identification module value: if the checkword matches the second identification module value, the device unlocks itself for operation.

Accordingly, it is an object of the present invention to provide methods and apparatus to provide a mobile telecommunications handset with a locking mechanism specific to a particular service provider (e.g., operator of multiple networks), a particular network, a particular reseller, or even to an individual.

It is another object of the present invention to lock a device to a particular controlling entity, to encode that device with device-specific characteristic information, and to modify that device-specific characteristic information from a remote location in order to yield information characteristic to the controlling entity to serve as a key for unlocking the device.

It is another object of the present invention to disable locking of devices locked according to the present invention via the keyboard of the device, or remotely, once a condition has been met (e.g., once the initial contract period for a wireless telephone subscription has expired).

It is a further object of the present invention to permit activation and unlocking of a pre-locked device to be conducted remotely (e.g., over-the-air), and to permit remote transmission to the device of a modifier or other code for use in the unlocking the device.

It is also an object of the present invention to permit a mobile telecommunications handset or other device to be re-locked from a remote location to the same operator, network, reseller or individual SIM by a central facility, for security or other reasons, and unlocked once again during a remote activation process.

It is still another object of the present invention to permit a mobile telecommunications handset or other device to be re-locked over-the-air to a different operator, network, reseller or individual SIM via a transmission from a remotely located central facility, for security or other reasons, and unlocked once again during a remote activation process.

It is yet another object of the present invention to provide an approach to achieving the above-enumerated objects, and to do so with sufficient security to prevent a concerted attack by any operator, dealer or distributor, in addition to the efforts of individual subscribers.

It is an additional object of the present invention to provide enhanced security as described above, such that if, for example, individual handsets were to be compromised, the solution should not be generally applicable to other handsets supplied by that operator, network, or reseller.

It is an added object of the present invention to provide methods and apparatus for a permanent handset locking or disabling mechanism for, e.g., handset rental, wherein the locking may be permanently disabled (and the handset permanently enabled) by the user's entry of a PIN, or via a remotely transmitted instruction by the party with which the user has entered into an agreement.

Other objects, features, and advantages of the present invention will become apparent with reference to the remainder of the written portion and the drawings of this application.

BRIEF DESCRIPTION OF THE DRAWINGS

FIG. 7 shows in tabular form the partial view of the implementation of an embodiment of a batch-specific locking key or algorithm ($k_{batch}$) according to the present invention and as shown in FIG. 6.

DETAILED DESCRIPTION

Figure 1:
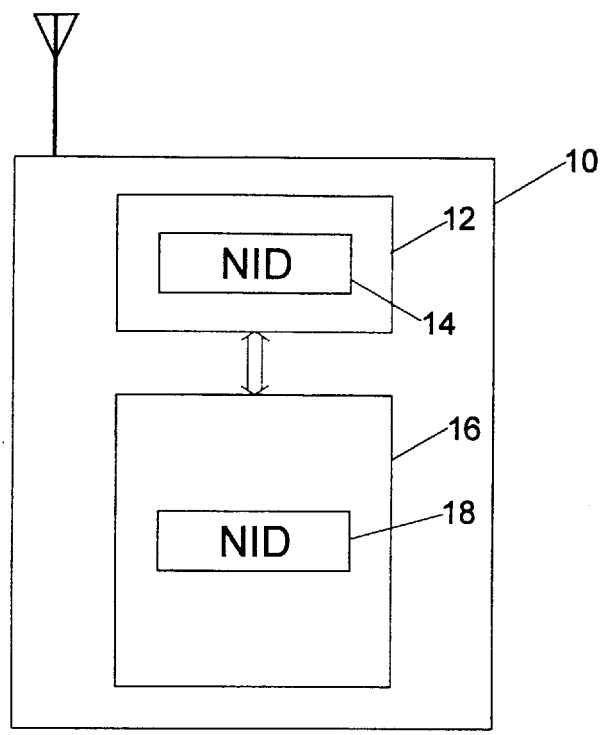
FIG. 1 shows schematically a prior art telecommunications handset locking arrangement.

As described in the background section of this document, an existing approach to locking a telecommunications handset (frequently referred to herein for convenience as "handset") is shown in schematic form in FIG. 1. Briefly, the design of handset 10 is intended to preclude its use except under the authorization of a particular network or other controlling entity—which may have furnished handset 10 under a subsidy. With this goal in mind, handset 10 associated with the controlling entity is marketed in a pre-locked state, and is permanently programmed at the time of manufacture with a code specific to that entity. For example, handset 10 may include a processor 12 coupled to a read-only-memory ("ROM") or other permanent memory programmed with an entity-specific code 14, such as a network ID (NID). In order to unlock handset 10, it is necessary to insert into it a SIM 16 containing integrated circuitry programmed with the same entity-specific code 18 as the one permanently programmed into handset 10. Processor 12 of handset 10 directs circuitry in handset 10 to read the code from a known location in SIM 16 and to compare retrieved code 18 with permanently programmed code 14. If the handset logic detects a match, it unlocks handset 10.

For security purposes, entity-specific code 14 is encoded in handset 10 such that a user is incapable of modifying it without destroying the handset. Otherwise, the user could modify code 14 in handset 10 at will to match code 18 on SIM 16 that was programmed or otherwise obtained without the authorization of the controlling entity. This approach, however, is exceedingly rigid, in that the handset must be permanently associated with the particular network or other entity responsible for its manufacture and marketing in the first instance.

Figure 2:
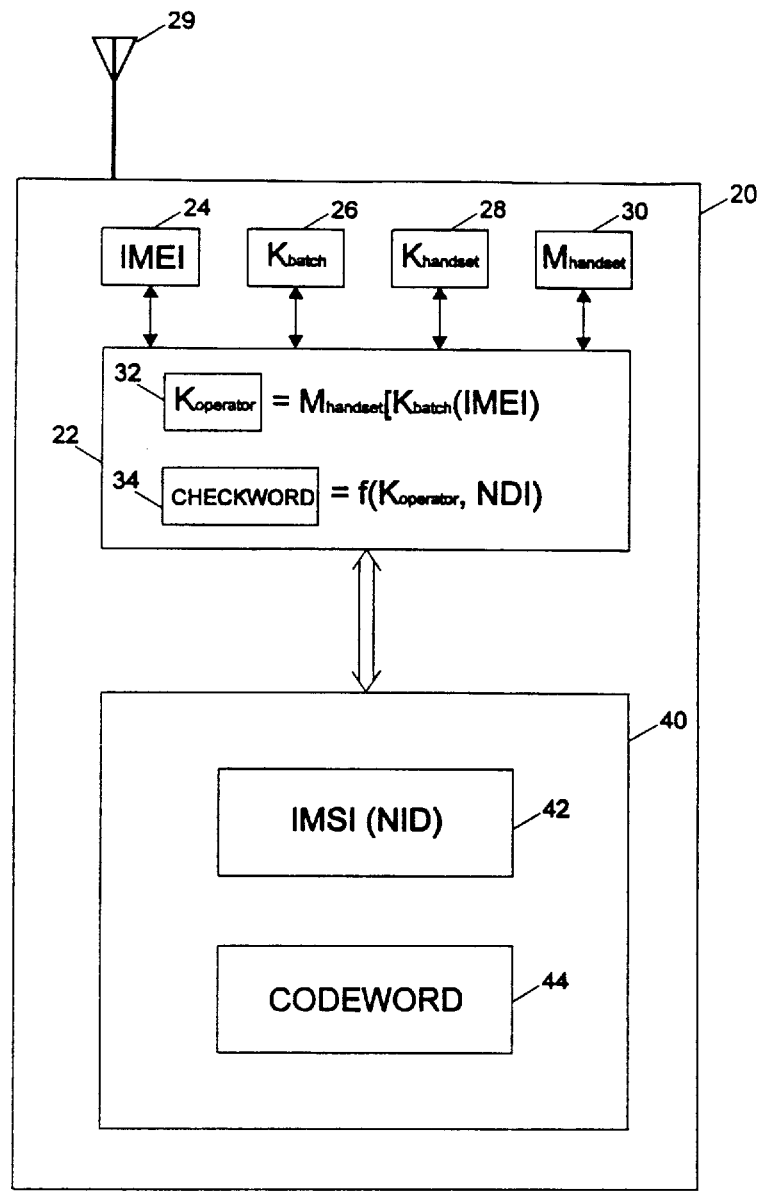
FIG. 2 shows schematically an embodiment of the present invention, in which a telecommunications handset is locked to a particular service.

The methods and apparatus according to the present invention provide an alternative to the narrow and rigid approach offered by the existing scheme. The present invention, shown in part in FIG. 2, provides a locking scheme in which information permanently programmed into a handset 20 is utilized, but which introduces a more flexible approach to producing a modifiable checkword corresponding to a codeword carried on a SIM 40. Using this inventive approach, handset 20 can be locked in any number of ways: (1) to a particular set of networks run by a service provider such as a network operator; (2) to a particular single network; (3) to a particular wireless reseller; or (4) even to a particular SIM. The inventive approach thus provides a method that permits the handset to be conveniently unlocked by an authorized user.

In FIG. 2, handset 20 includes processor 22 capable of processing messages received by handset 20 using known hardware and according to known methods. At the time of manufacture, a memory device in handset 20 is permanently programmed with an equipment identification number. For example, under the GSM standard (again referred to here for purposes of illustration only, and without implying any limitation on the scope of the invention to the use of this or any other particular standard or standards) handset 20 is permanently programmed according to known methods with an equipment identification number (e.g., IMEI) 24, preferably in such a manner that this number cannot be overwritten without destroying the handset or otherwise requiring professional service.

Handset 20 according to the present invention is also encoded, most preferably at the time of manufacture, with a key. This key, which is to be used in the computation of an authorization (unlocking) checkword, is most preferably a value specific to the handset itself. Although not necessarily unique in a strict sense, it should not be shared by any defined group of handsets. If this condition is met, it should not be possible to deduce the key from the equipment identification number or from the keys of other devices having such keys.

For example (but without limitation), the key may be derived by an algorithm specific to the entire batch of handsets of which handset 20 was a part. An example of such a key is referred to as $k_{batch}$ 26. A preferred manner of implementing $k_{batch}$ 26, as described in greater detail below in connection with FIG. 6 (but without limitation), is as a mask-programmed function. This approach ensures that $k_{batch}$ 26 cannot be read or modified without destroying the handset 20 or rendering it inoperative. As described in greater detail below, under this approach $k_{batch}$ 26 operates upon information characteristic to handset 20 to produce a key also characteristic to handset 20, referred to as $k_{handset}$ 28.

Although a unique, secure $k_{handset}$ 28 may be conveniently derived from information characteristic to handset 20 using an algorithm such as $k_{batch}$ 26, alternative approaches might be used. The key $k_{handset}$ 28 would in this case preferably be securely stored at a desired location in the handset at the time of manufacture.

The locking scheme according to the present invention depends upon $k_{handset}$ 28 (whether or not it is derived as a function of $k_{batch}$ 26 and the equipment ID (e.g., IMEI 24)) being secure and known by the controlling operator alone. Therefore, $k_{handset}$ 28 values should be delivered by the manufacturer directly to the controlling operator. The handsets 20 themselves, on the other hand, may be sent from the factory directly to the retailers for sale to the public (e.g., at a subsidized price).

During the activation process, described at greater length below, handset 20 receives from a central facility information capable of being used to transform the unique, secure values of handset 20 into secure information specific to the controlling entity (such as the operator, network, reseller, etc.). For example, handset 20 should be able to receive on antenna 29, and retrievably store, a modifier value $M_{handset}$ 30. Modifier value $M_{handset}$ 30 is preferably stored in a suitable electronically erasable read-only-memory (EEPROM) or flash memory (not explicitly shown), so that it is retained on powering down handset 20, but can be re-written by handset 20 upon command.

Handset 20, using available technology, should be capable of receiving a conventional SIM 40 containing information including a subscriber identification number including a network ID 42 (e.g., without limitation, International Mobile Subscriber Identification (IMSI) (incorporating MNC)). SIM 40 also should be capable of containing an authorization codeword 44. Processor 22 and circuitry (not shown) of handset 20 also should be capable of reading such values from, and writing new ones to, SIM 40.

Processor 22 of handset 20 can be implemented by conventionally available processing technology, so long as that processing technology can be adapted to perform certain logical and arithmetic operations described in this document and includes or can access memory means for storing equipment ID (e.g., IMEI) 24, $k_{batch}$ 26, $k_{handset}$ 28 and $M_{handset}$ 30. Although the operations corresponding to a preferred embodiment of the present invention are described at greater length below, the processor 22 of handset 20, in brief, should be adapted to compute a value specific to a controlling operator, i.e., $k_{operator}$ 32, as a function of $M_{handset}$ 30, $k_{batch}$ 26, and equipment ID (e.g., IMEI) 24. Also, processor 22 should be adapted to compute a checkword 34 as a function of $k_{operator}$ 32, and, for example, entity or network identification (NID) 42 which may be, include or be derived from a subscriber ID (e.g., IMSI).

At the time of purchase, handset 20 remains in the locked state in which it was manufactured. In this state, handset 20 preferably is not enabled for anything but making emergency telephone calls (e.g., 911 service in most areas of the United States of America), and for activating the subscriber's account. Activation of a subscriber's account is a precondition to unlocking handset 20 according to the method of the present invention.

Figure 3:
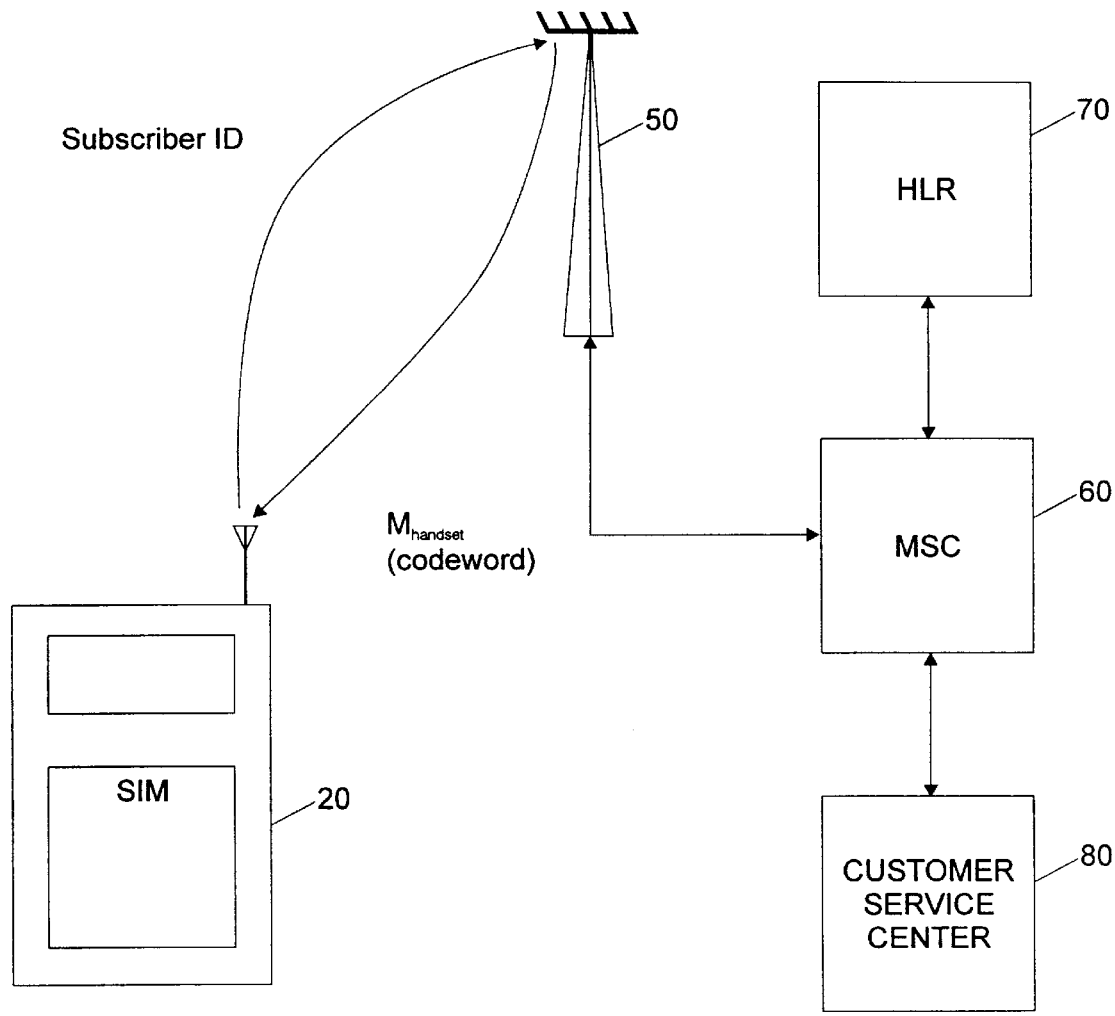
FIG. 3 shows schematically a system for implementing the embodiment of the present invention shown in FIG. 2.

The activation process is shown in schematic and highly simplified form in FIG. 3. In addition, the process is presented in the form of a flowchart (100), and with greater detail, in FIG. 4. Again, handset 20 initially is locked (at 102 in FIG. 4) to preclude its being used for anything but activation or emergency calls. Upon receiving handset 20 (following its purchase or rental), the user inserts SIM 40. SIM 40 may also have been obtained upon purchase or rental, or may be held by the user in conjunction with a preexisting account, or according to any other suitable arrangement. As long as the battery (not shown) has been charged, the user at step 104 can power up the handset 20 by pressing a power key (not shown), or, alternatively, for certain handsets merely by pressing any keypad key. The number dialed on the handset 20 will be transmitted at step 106 to the mobile telephone base station 50 that receives the strongest signal from handset 20. Possibly among other information, handset 20 at step 106 transmits subscriber identification information, which will have been read off SIM 40 (e.g., IMSI or a portion thereof). Mobile telephone base station 50 forwards this communication to a mobile switching center ("MSC") 60. At 108, MSC 60 enters a home location register ("HLR") 70 with the subscriber identification information to determine the validity of the caller. Assuming the call is legitimate for that network, the HLR identifies at step 110 the subscriber identification number as temporary (indicating that the subscription has not yet been activated). MSC 60 then routes the call to a central facility, such as a customer service center ("CSC") 80. At 112, customer service personnel or an automated system at CSC 80 collects various information from the user regarding, for example (but without limitation), payment details and service options.

CSC 80 also initiates over-the-air activation. (In other embodiments of the invention, this remote activation could be done via alternative transmission paths.) At 114, CSC 80 transmits a permanent subscriber identification number to handset 20 via MSC 60 and mobile telephone base station 50. This transmission may be sent using an available messaging function, such as GSM short messaging service ("SMS"), or similar capability available under an alternative mobile telecommunications standard. Handset 20, on receiving the permanent subscriber identification number (e.g., without limitation, IMSI), stores it on SIM 40.

Then, at 116, CSC 80 computes a valid $M_{handset}$ 30 based on its knowledge of $k_{operator}$ 32, the single key for all handsets within the operator's control, and $k_{handset}$ 28. Recall that $k_{handset}$ 28 was delivered to the controlling operator immediately following manufacture of the handsets, and was derived from $k_{batch}$ 26 and the equipment ID (e.g., IMEI) 24. CSC 80 knows $k_{batch}$ 26 and can retrieve equipment ID (e.g., IMEI) 24 remotely (e.g., over-the-air). Via GSM SMS, for example (but without limitation), CSC 80 transmits $M_{handset}$ 30 to the handset. At step 118, handset 20 stores $M_{handset}$ 30 in a memory device that preserves the stored data upon powering down of the handset 20, but that also permits overwriting of that data with an updated $M_{handset}$. For example, the updated $M_{handset}$ is stored in an EEPROM, flash memory, or other memory device coupled to and readable by the processor 22 of handset 20. Also, the service provider may download a new subscriber identification code (e.g., (IMSI) to handset 20).

Equipped with a new subscriber identification code (such as IMSI), and $M_{handset}$ 30, it is necessary for the handset 20 to re-register with the mobile telephone base station 50 and MSC 60 using this new information. Accordingly, at step 120, CSC 80 sends a message to handset 20 that the user should switch the handset off and on. Receiving this instruction, processor 22 writes this message to the display (not shown) of handset 20.

Figure 5:
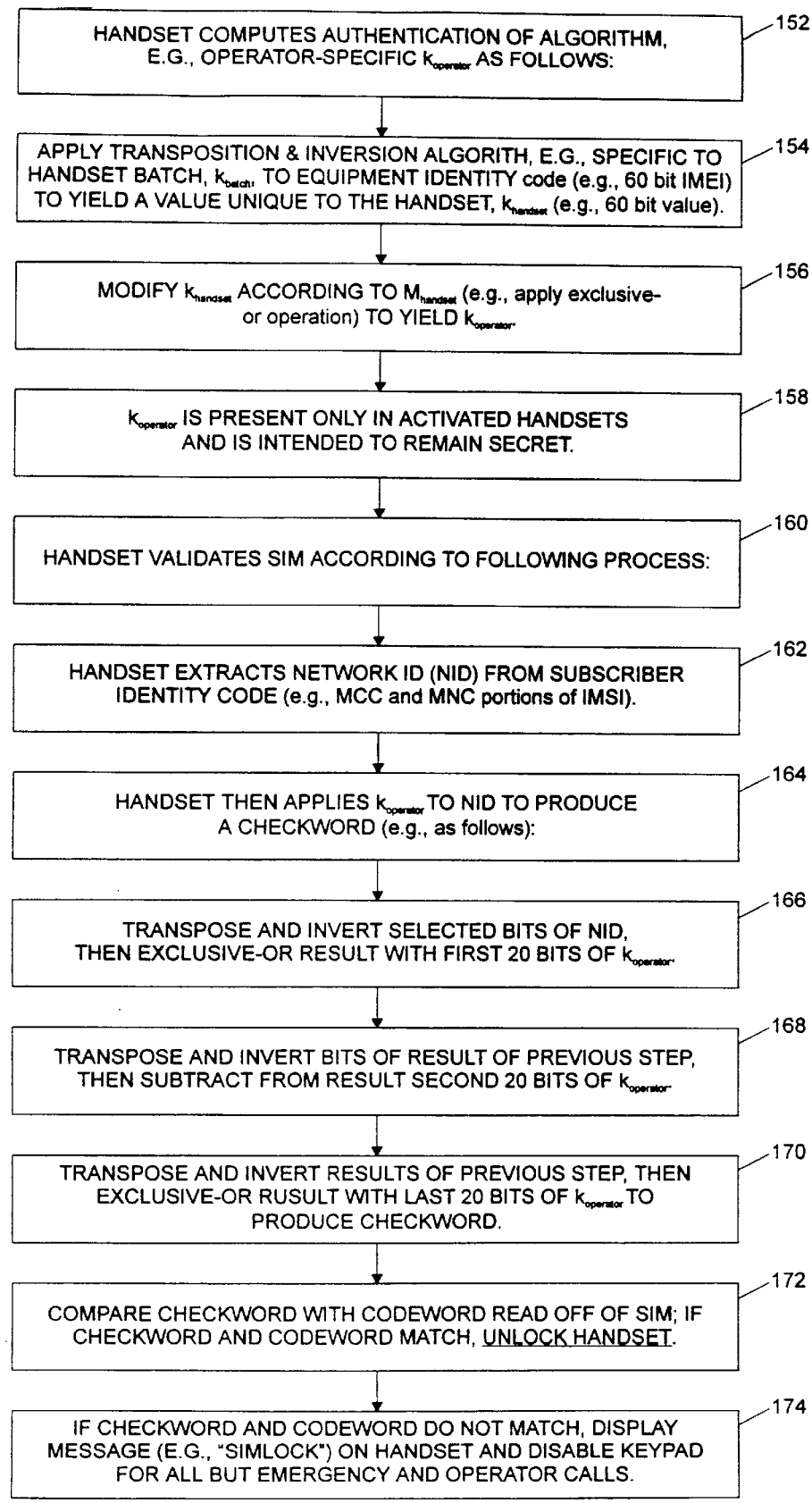
FIG. 5 shows a flowchart of a portion of the operation of an embodiment of a method according to the present invention, corresponding to FIGS. 2, 3 and 4, the flowchart setting forth steps involved in the authentication of a codeword on a SIM inserted into the telecommunications handset.

Up to this point, handset 20 remained in its pre-locked state, unable to permit anything but activation and emergency calls. Upon powering up in step 120, however, processor 22 enters an authentication procedure 150, illustrative steps of which are set forth in FIGS. 5 and 9. The authentication process begins at step 152 with the handset computing the operator-specific key, $k_{operator}$ 32. This computation begins by applying $k_{batch}$ 26, which was incorporated into handset 20 at the time of manufacture, to the equipment identification code (e.g., IMEI) 24.

As described briefly above, the present invention provides a handset 20 or other terminal device with a secure, corresponding key, $k_{handset}$ 28, necessary for unlocking the device for the controlling entity identified on SIM 40. One convenient approach is to derive $k_{handset}$ 28 from equipment-specific ID 24, using, e.g., $k_{handset}$ 26. Although, the key $k_{batch}$ 26 may be any secure key or operation, in the illustrated embodiment it is an algorithm that operates on equipment identification code (e.g., IMEI) 24 to produce a secure, encrypted value, $k_{handset}$ 28.

Figure 6:
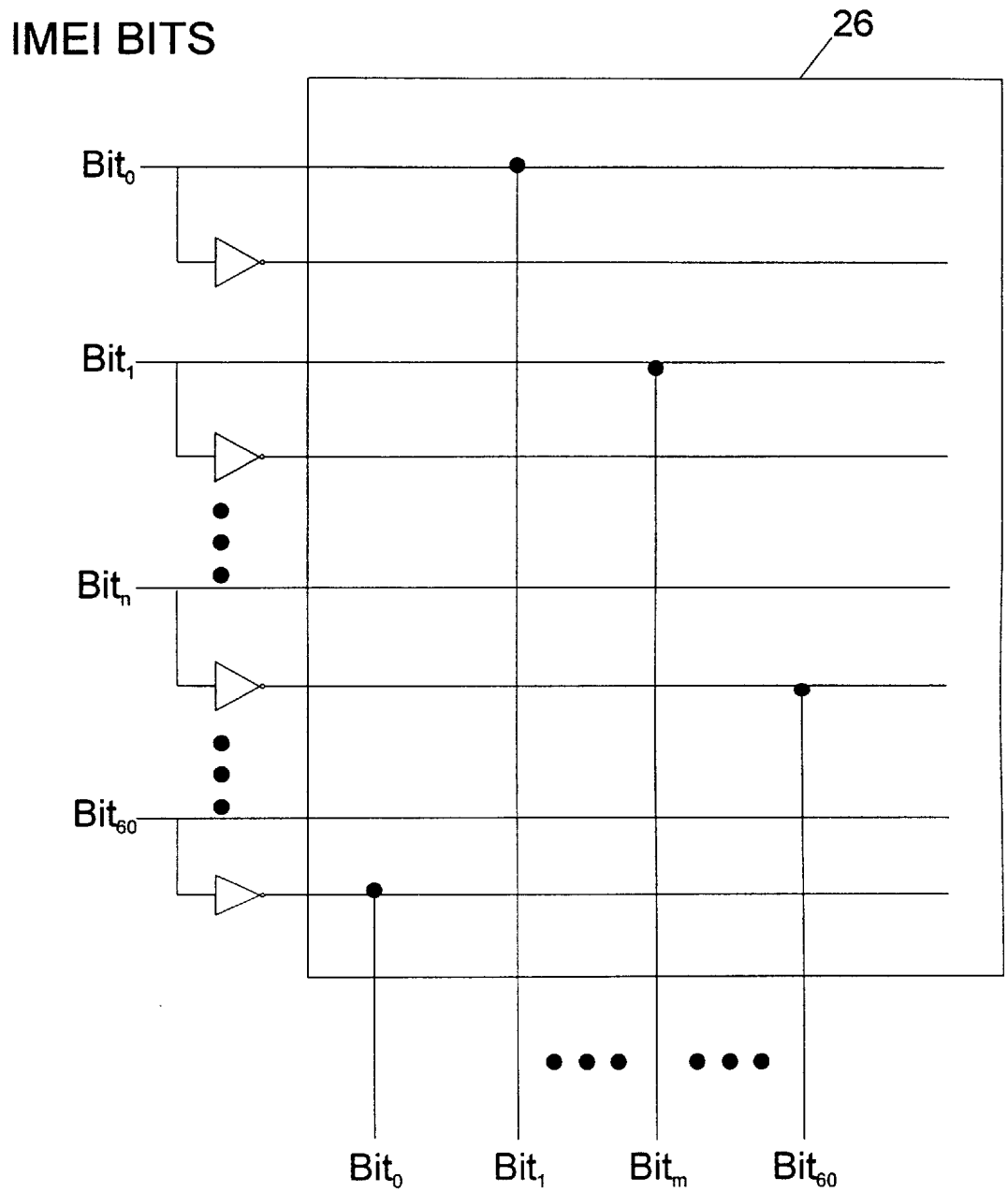
FIG. 6 shows a schematic, partial view of one implementation of an embodiment of a batch-specific locking key or algorithm according to the present invention.

An illustrative partial example of a $k_{batch}$ 26 according to the present invention is a mask-programmed mapping function, illustrated in FIG. 6. Bits of IMEI (or any equipment identification code) are applied to input leads of $k_{batch}$ 26 ($Bit_0$, $Bit_1$, ..., $Bit_n$, ..., $Bit_{60}$). Each of these leads is a direct input to $k_{batch}$ 26, and each is also inverted by a corresponding logical NOT gate, so that the inverse of each bit is also an input to $k_{batch}$ 26. Mask-programmed $k_{batch}$ 26 is a mapping from each input bit (either the input or its inverse) to an output bit, the output bits taken together forming a handset-specific key, $k_{handset}$ 28. In the illustrative, partial example of FIG. 6: $k_{handset}$ $Bit_0$ takes the value of the inverse of $Bit_{60}$ of the equipment identity 24; $Bit_1$ of $k_{handset}$ 28 takes the value of $Bit_0$ of equipment identity 24; $Bit_1$ of equipment identity 24 is mapped onto $Bit_m$ of $k_{handset}$ 28; and $Bit_{60}$ of $k_{handset}$ 28 takes on the inverted value of $Bit_n$ of equipment identity (e.g., IMEI) 24. This mapping can be seen, perhaps slightly more clearly, in the table of FIG. 7.

Figure 8:
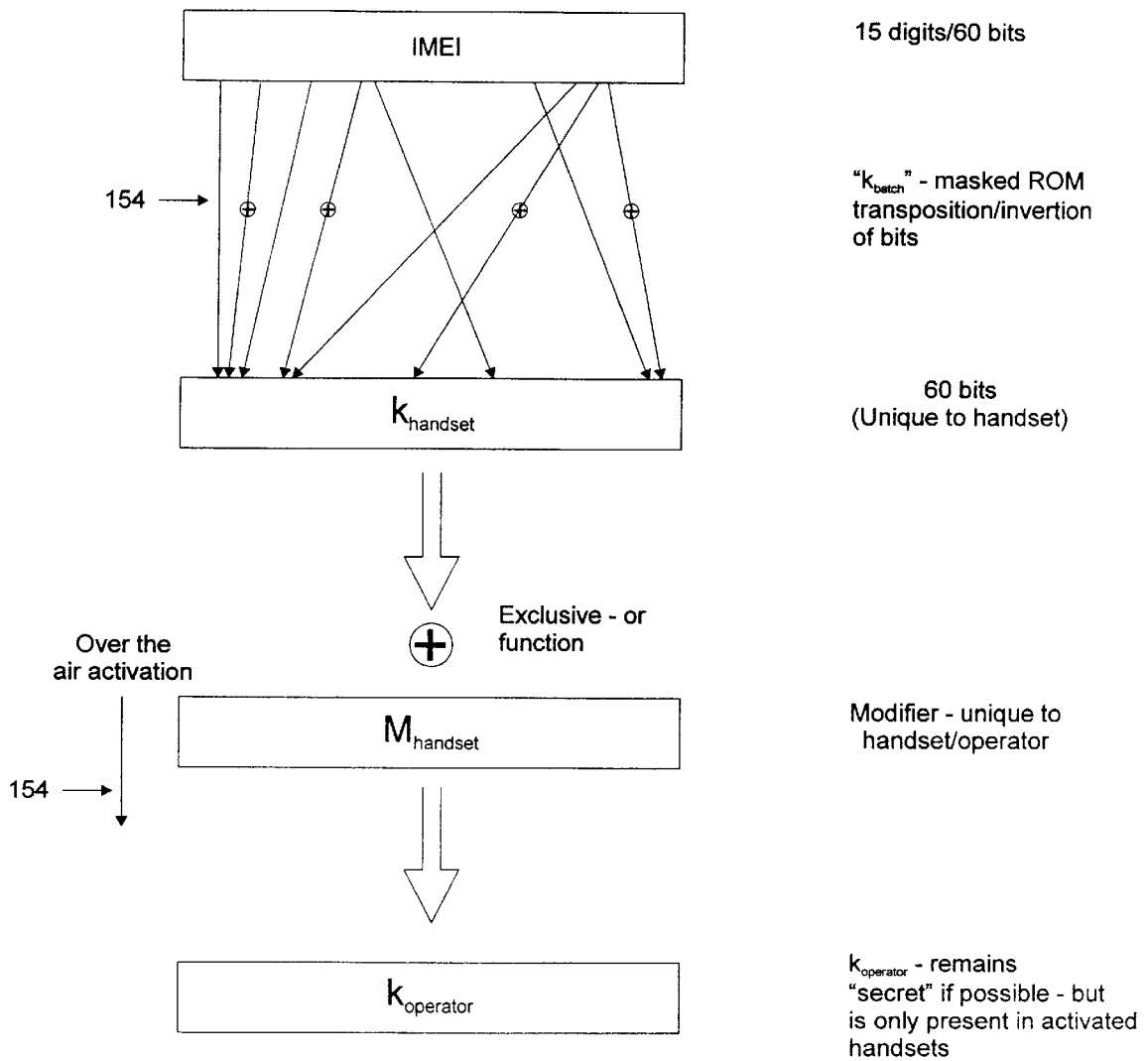
FIG. 8 shows in schematic form the derivation of an operator-specific key ($k_{operator}$) as set forth in the flowchart of FIG. 5.
Figure 9:
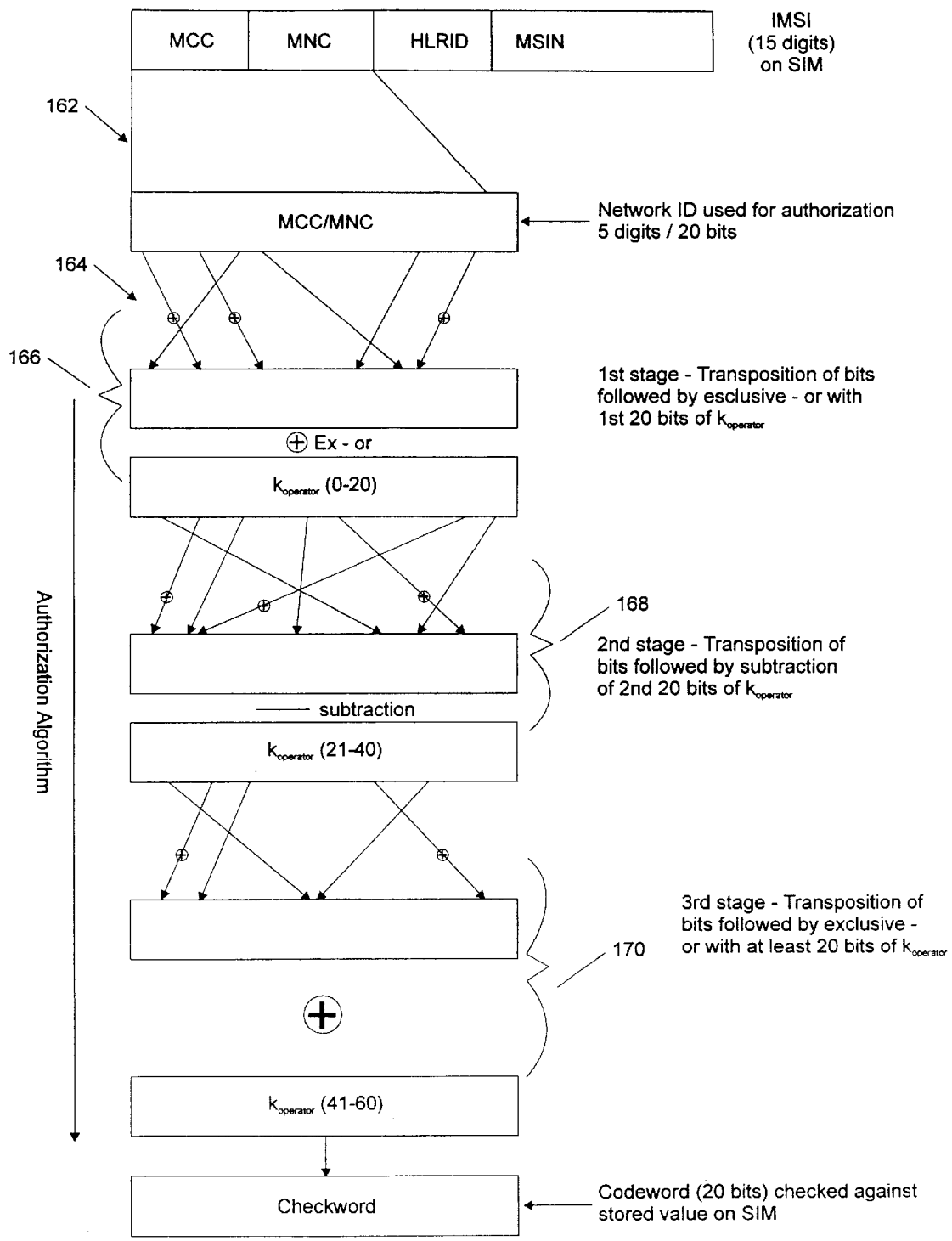
FIG. 9 shows in schematic form the authentication of a codeword on a SIM as set forth in the flowchart of FIG. 5.

Returning to FIG. 5, and referring as well to FIGS. 2, 8 and 9, step 154 produces a value that should be specific to the handset 20 (since it is a function of the equipment identification code (e.g., IMEI) 24, which is itself unique to the handset 10). Once $k_{handset}$ 28 has been arrived at by applying $k_{batch}$ 26, the former is modified by being operated on as a function of $M_{handset}$ 30 to produce a key, $k_{operator}$ 32. This key, $k_{operator}$ 32, is arrived at and used by all handsets locked to the given controlling entity. For example, but without limitation, $k_{operator}$ 32 is computed as the logical exclusive-or of the binary values $k_{handset}$ and $M_{handset}$:

$$k_{operator} = k_{handset} \oplus M_{handset}.$$

Figure 4:
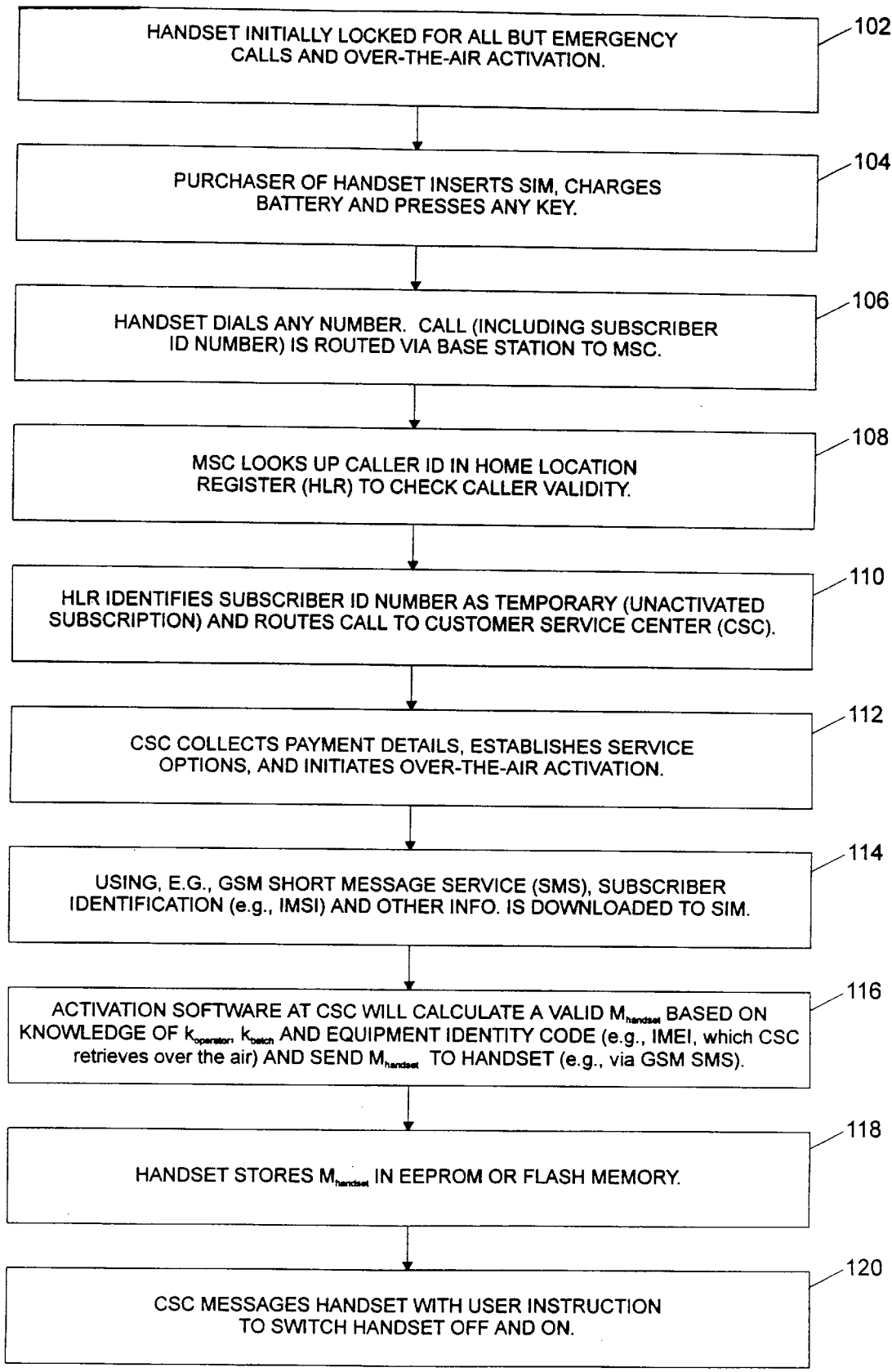
FIG. 4 shows a flowchart of a portion of the operation of an embodiment of a method according to the present invention, corresponding to FIGS. 2 and 3, the flowchart setting forth steps involved in a remote (over-the-air) activation of a telecommunications handset.

As a brief aside, recall that the text accompanying FIG. 4, above, mentioned that $M_{handset}$ 30 could be selected by CSC 80 knowing a desired $k_{operator}$ 32, equipment identity number 24 (retrieved over the air) and $k_{batch}$ 26. In order to understand how this is done, note that for the illustrated operations used in arriving at $k_{operator}$ 32, $M_{handset}$ 30 must have as many digits as $k_{handset}$ 28 (which in turn has as many digits as equipment identification code (e.g., IMEI) 24). In general, this is not necessarily the case; the operations on equipment identity code (e.g., IMEI) 24 do not need to preserve the number of digits in each term. Nevertheless, since the complexity of the code-cracking problem varies with the size of the words involved, preservation of the number of digits with each computation tends to avoid diminishing the degree of security provided by the approach. Since $k_{operator} = [k_{handset} = k_{batch}(IMEI)] \oplus M_{handset}$, knowing $k_{batch}$ and IMEI (i.e., knowing $k_{handset}$), and being able to select $k_{operator}$, permits solving for $M_{handset}$. When the operation is logical exclusive-or, $M_{handset}$ can be computed simply by performing the following operation:

$$M_{handset} = k_{operator} \oplus k_{handset}.$$

As indicated at step 158, $k_{operator}$ 32 is present in (and, preferably, only in) activated handsets and is intended to remain secret. If $k_{operator}$ is no longer secret, or for other reasons, it may be reset as described below in connection with FIG. 8.

Once $k_{operator}$ 32 has been computed, the processor 22 of handset 20 validates the SIM 40 according to a process 160, the steps of which are set forth in steps 162–174. The essence of this aspect of the method according to the present invention is to perform an operation on a network identification (NID) 42 contained on SIM 40, using the modified key (i.e., $k_{operator}$ 32), to produce a checkword 34 that matches a codeword 44 also contained on SIM 40.

First, processor 22 at step 162 reads a network identification (NED) 42 value off the SIM 40. If the SIM 40 were implemented under the GSM standard, for example, the NID value is the MCC (mobile country code) and MNC (mobile network code) described in the Background section of this document. At step 164, processor 22 applies $k_{operator}$ 32 to the identification number (e.g., NID) 34 to produce checkword 42. According to the present invention, the operation upon the network identification (ND) 42 as a function of $k_{operator}$ 32 may be any suitable operation that is a one-way function, so that $k_{operator}$ 32 cannot be deduced from a limited set of identification number (e.g., NID) 42-checkword 34 pairs. As one example, but without limitation, the binary digits of identification number (e.g., NID) 42 are transposed and inverted. They are then applied according to the logical exclusive-or operation to an identically sized subset of $k_{operator}$ 32.

The foregoing approach can be repeated, and any number of additional operations may be performed consistent with the present invention. The example provided in the flowchart of FIG. 5 at step 166 transposes and inverts selected bits of the identification number 24 (e.g., MCC and MNC of GSM, a 20 bit number) and then performs the logical exclusive-or operation of the result with the first 20 bits of $k_{operator}$ 32. (Again, more generally, the exclusive-or operation could be performed on any 20 bits of $k_{operator}$ 32). At step 168, the result of step 166 is transposed and inverted in a preselected manner and the second twenty bits of $k_{operator}$ 32 are subtracted from the result of that transposition and inversion process. The result of step 168 is then transposed and inverted in a preselected manner in step 170, and the expression that results is combined under a logical exclusive-or with the final twenty bits of $k_{operator}$ 32. The result of step 170 is checkword 34.

At step 172, processor 22 reads codeword 44 off SIM 40 and compares checkword 34 with that value. If the two values match, processor 22 unlocks or enables handset 20 for general use. At step 174, if checkword 34 does not match codeword 44, processor 22 transmits to the handset display (not shown) an appropriate user message, such as "SIM-LOCK" or "DENIED", and keeps the keypad (not shown) of handset 20 locked or otherwise disabled for everything but emergency calls.

The methods and apparatus according to the present invention also permit handset 20 to be re-locked for any reason. If, for example, a subscriber were to be permitted to move to a different network or to a reseller, but handset 20 were to remain locked, $k_{operator}$ 32 could be modified so as to re-lock the handsets of the affected subscribers. Alternatively, if $k_{operator}$ 32 were changed for security or administrative reasons (e.g., if $k_{operator}$ 32 were believed to have been compromised), a new $k_{operator}$ 32 could be disseminated to the affected devices remotely from CSC 80.

Figure 10:
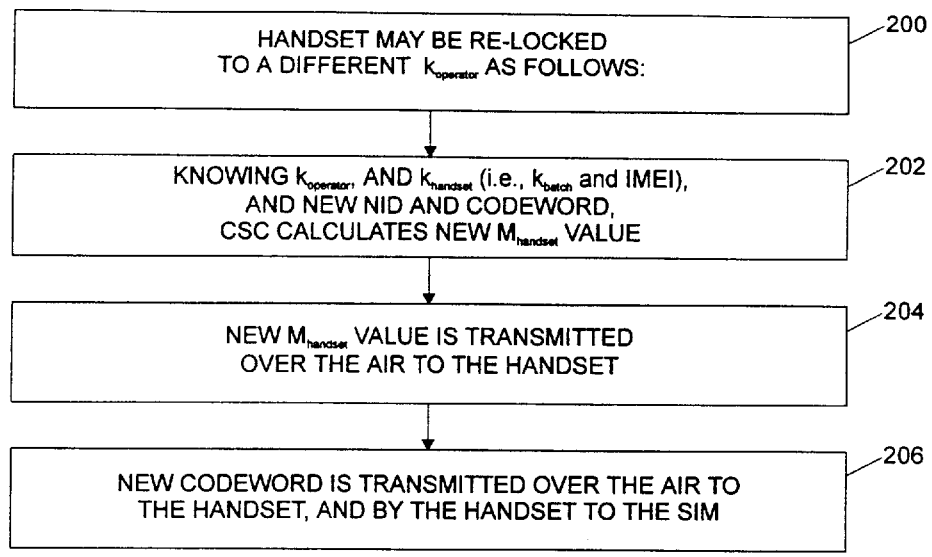
FIG. 10 shows a flowchart describing steps associated with an embodiment of a re-locking approach according to the present invention.

Performed remotely (for example, but without limitation, over-the-air), this modification process can be implemented in a manner that is entirely transparent to the caller. The re-locking process is illustrated in the flowchart for process 200 in FIG. 10. If re-locking were to be done, affected subscribers could be issued new SIMs having a revised NID and codeword. Alternatively, that information could be modified remotely, if desired, such as via a signal transmitted over-the-air (or via another path).

As indicated at step 202, knowing $k_{batch}$ 26 and equipment ID (e.g., IMEI) 24—and therefore $k_{handset}$ 28—permits computation of a new appropriate $M_{handset}$ 30. When the new $M_{handset}$ 30 is combined with $k_{handset}$ 28 according to the present invention, the result will yield the appropriate $k_{operator}$ 32, which, when applied to the (possibly new) network (or other) identification 42, will produce a checkword 34 corresponding to the new codeword 44.

If desired, the locking scheme according to the present invention could be maintained in effect for a handset 20 or other device indefinitely. For example, the device might, according to the present invention, be locked to a particular SIM 40 in order that the locked device be used only by the rightful owner or operator—in possession of that SIM 40.

However, when a service provider, such as a network operator, has subsidized the purchase of a handset 20 by a subscriber, under the condition that the subscriber's use of the handset 20 be limited for a particular amount of time, eventually it will be necessary to permanently unlock the device. When it has been unlocked, handset 20 can be used with any compatible SIM 40. For example, in GSM systems, a permanently unlocked handset 20 will be usable with any GSM SIM.

Figure 11:
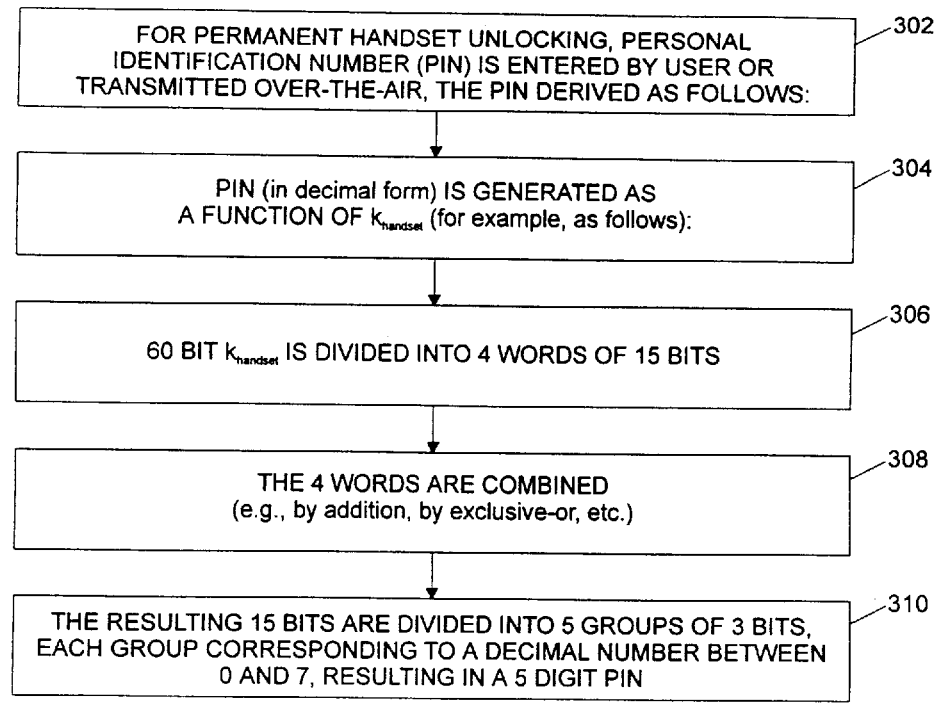
FIG. 11 shows a flowchart describing steps associated with an embodiment of a permanent unlocking approach, employing personal identification number, according to the present invention.
Figure 12:
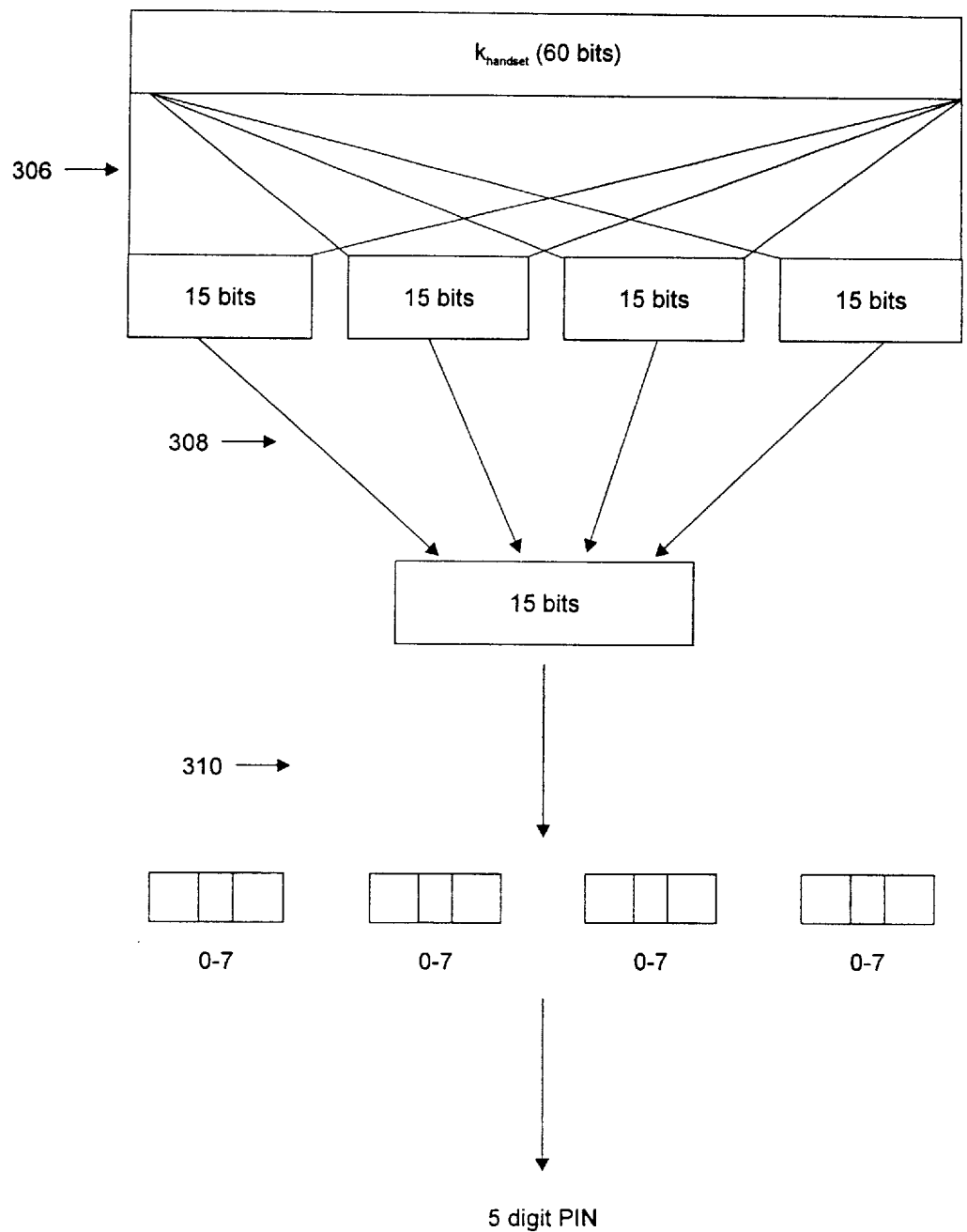
FIG. 12 shows in schematic form the derivation of a personal identification number for permanent unlocking of a handset or other device based on equipment identification number, as set forth in the flowchart of FIG. 11.

According to the present invention, and illustrated in FIGS. 11 and 12, permanent unlocking can be done in at least two ways. One method (process 300, FIG. 11) for permanently unlocking a handset 20 or other device locked in the above-described manner is for the CSC 80 or other central facility to transmit an unlock command, such as a PIN (personal identification number) to the handset over-the-air (or via other transmission means) at the expiration of the contractual period (step 302). The PIN (or other permanent unlock command) for a handset should uniquely correspond to the particular handset in order to avoid permanently unlocking any devices for which the contractual locking period has not expired. As with $k_{handset}$ 28, the PIN does not necessarily have to be unique in a strict sense; rather, there should be a sufficient number of combinations of PINs available to make successful guessing effectively impossible. An unlock command having this characteristic preferably can be derived, as specified at step 304, from the equipment ID (e.g., IMEI) 24.

The approach according to the present invention is to divide a quantity that is unique to the device (e.g., been derived from the equipment ID (e.g., IMEI) 24) into subsets that are mathematically and/or logically combined with each other. The resulting combination is then subdivided to yield a decimal or other-based number.

In the illustrated embodiment, at step 306, assuming that $k_{handset}$ 28 is a 60 bit word (as it would be under the GSM standard, derived from IMEI), $k_{handset}$ 28 is divided into 4 words of 15 bits each. At step 308, the four words are combined, by an exclusive-or-operation, for example, or any other logical or mathematical operation, into another 15 bit word. The resulting 15 bit word, as shown at step 310, is divided into 5 groups of 3 bits each. Each of the 3 bit groups corresponds to a number, between 0 and 7 (i.e., a base 8 integer) resulting in a 5 digit PIN. This approach reduces an unwieldy quantity ($k_{handset}$) to a PIN that is not too long to be kept in mind, and that has a sufficiently large number of potential combinations (32,768) that the chances of an unscrupulous person successfully entering the proper PIN by chance would be negligible. Alternatively, the 60 bit $k_{handset}$ could be divided into any number of words, each of which could be combined in any number of ways, to produce a resulting word that itself could be divided in any number of ways to produce binary numbers. The resulting binary numbers are then mapped into another base (greater than 2) for easier memorization.

This method according to the present invention for computing a PIN from the equipment identification number (e.g., IMEI) 24 of a handset is not limited to the particular operations set forth in FIGS. 11 and 12. These operations can be varied in any number of ways consistent with the principle of deriving the PIN from unique identifying information, such as equipment identification number (e.g., IMEI) 24.

The method steps illustrated in the flowcharts accompanying and described in this document, including their particular content and arrangement, are merely illustrative of a preferred manner of performing aspects of the present invention. They are not intended to, and do not, limit the description or claims set forth in this document to the particular steps. Other arrangements of steps consistent with the principles described in this document are believed to be equally within the scope of this aspect of the present invention.

The foregoing descriptions are intended to illustrate, explain, and describe embodiments of the present invention. Further modifications and adaptations to these embodiments, such as particular ways of programming processor 22, the ways in which values of interest are stored and arranged in memory devices, and other details, will be apparent to those skilled in the art and may be made without departing from the scope or spirit of the invention. The logic and hardware described in this document could be used, for instance, to implement a locking scheme not only for mobile telecommunications handsets, but also for other devices. The present invention is of value for locking devices for which enhanced security (employing a SIM is desirable, but for which it is also desirable that the specification of locking keys not be limited to a particular manufacturer for all time, but rather be assignable to other entities—including the user herself—or be modifiable remotely over-the-air, via telephone, or via cable. Examples of such a device incorporating the principles and techniques of the present invention might be a home appliance (for example, a set top box, a computer, an Internet access device, a video player, or other devices). As long as the device includes the processing, memory, transmitting and receiving hardware, and SIM-receiving and reading capabilities described above, its operation could be locked according to the methods of the present invention such that only a person having the appropriately programmed SIM would be able to unlock and operate the device. For added security, the key and SIM codeword could be varied upon request or on a periodic basis to decrease even further the chances of an unscrupulous party discovering and programming a SIM with the appropriate codeword.

What is claimed is:

1. A method of unlocking a pre-locked device, the device adapted to receive signals from a remotely located facility, and further adapted to receive, and having received, an identification module containing a first value and a second value, the method comprising the steps of:
   computing a key as a function of a signal received from the remotely located facility;
   computing a checkword as a function of the key and the first identification module value;
   comparing the checkword with the second identification module value; and
   if the checkword matches the second identification module value, unlocking the device for operation.

2. The method according to claim 1, wherein the device is encoded with characteristic information, and the key is computed also as a function of the characteristic information.

3. The method according to claim 2, wherein the characteristic information comprises an equipment identification number.

4. The method according to claim 3, in which the equipment identification number comprises a GSM IMEI.

5. The method according to claim 3, wherein, in the computation of the key, the characteristic information is first operated upon by an algorithm to produce a second set of characteristic information.

6. The method according to claim 5, wherein the algorithm is specific to the manufacturing batch of which the pre-locked device was a part.

7. The method of claim 5, wherein the algorithm is a mask-programmed function.

8. The method according to claim 5, wherein, in computing the key, the characteristic information comprises binary digits, and the algorithm, alternatively, inverts, inverts and transposes, and transposes the binary digits to produce the second set of characteristic information.

9. The method according to claim 5, wherein, in computing the key, the second set of characteristic information is modified as a function of the signal received from the remotely located facility.

10. The method according to claim 9, wherein the signals which the device is adapted to receive from the remotely located facility are transmitted by a controlling entity and, in computing the key, the modification as a function of the received signal produces a third set of information characteristic of the controlling entity.

11. The method according to claim 9, wherein the signals which the device is adapted to receive from the remotely located facility are transmitted by a controlling entity and the signal received is a function of the second set of characteristic information and the third set of information, which is characteristic of the controlling entity.

12. The method according to claim 9, wherein the modification of the second set of characteristic information according to a signal received from the remotely located facility comprises a logical operation involving binary digits of both the second set of characteristic information and the signal received from the remotely located facility.

13. The method according to claim 1, wherein the identification module comprises a SIM and the first value stored on the SIM comprises information identifying a controlling entity in connection with the device.

14. The method according to claim 1, wherein the signal received from the remotely located facility is sent over-the-air.

15. The method according to claim 1, wherein the signal received from the remotely located facility is sent via a cable.

16. The method according to claim 1, wherein the device is a mobile telecommunications handset and the controlling entity is an operator of a telecommunications network.

17. The method according to claim 1, wherein the signals which the device is adapted to receive from the remotely located facility are transmitted by a controlling entity.

18. The method according to claim 17, wherein the device is a mobile telecommunications handset, the controlling entity is a mobile telecommunications network operator, and the signal received from the remotely located facility was via an over-the-air transmission.

19. The method according to claim 18, wherein the remote location is a customer service center operated by the network operator.

20. The method according to claim 17, wherein the controlling entity is a reseller of wireless telecommunications services, the first identification module value serves to identify a network service provider, and the computed key is characteristic of the reseller.

21. The method according to claim 17, wherein the controlling entity is an individual, and the first identification module value serves as an identification for a network service provider, and the computer key is characteristic of the individual.

22. The method according to claim 1, comprising the further steps of:
   receiving a second signal from the remote location;
   recomputing the key as a function of the second signal from the remote location.

23. The method according to claim 22, further comprising the steps of
   receiving from the remote location an updated value for the first identification module value;
   writing the updated value for the first identification module value to the identification module;
   receiving from the remote location an updated value for the second identification module value;
   writing the updated value for the second identification module value to the identification module;
   computing a new checkword as a function of the key and the updated first identification module value;
   comparing the new checkword with the updated second identification module value; and
   if the new checkword matches the updated second identification module value, unlocking the device for operation.

24. The method according to claim 22, wherein the device has received a second identification module value containing an updated first value and a updated second value, further comprising the steps of:
   computing a new checkword as a function of the key and the updated first identification module value;
   comparing the new checkword with the updated second identification module value; and
   if the new checkword matches the updated second identification module value, unlocking the device for operation.

25. A device comprising at least one memory device, and adapted to receive signals from a remotely operated facility and further adapted to receive an identification module containing a first value and a second value, the at least one memory device containing instructions for performing the method steps recited in claim 1.

26. A method of locking a wireless telecommunications terminal such that it can be unlocked for use only with proper authorization by a controlling wireless telecommunications system operator, the telecommunications terminal being one of a batch of such terminals and being uniquely identified by an equipment identification number, proper authorization being provided in the form of a subscriber identification module (SIM) containing information readable by the telecommunications terminal, the readable SIM information including an identification code and a codeword, the method comprising the steps of:

a. providing the telecommunications terminal with an operator-specific key, comprising the following steps:
   1. providing the telecommunications terminal with a first key unique to the batch from which the terminal derived, the key being known to the controlling operator;
   2. computing a second key unique to the terminal, the second key being a function of the equipment identification number and the first key, the computation being performed by the telecommunications terminal;
   3. transmitting a modifier to the terminal at time of activation, the modifier being used by the terminal; and
   4. computing a third, operator-specific key as a function of the second key and the modifier, the operator-specific key being common to all activated terminals under the control of the controlling operator;

b. computing a checkword, comprising the following steps:
   1. reading the identification code from the SIM;
   2. transforming at least a subset of the identification code as a function of the operator-specific key to yield a checkword;

c. reading the codeword from the SIM;
   d. comparing the checkword with the codeword; and
   e. if the checkword and the codeword match, unlocking the terminal.

27. A wireless telecommunications handset of the type which receives signals from a remotely operated facility comprising at least one memory device adapted to receive the signals from the remotely operated facility, and further adapted to receive an identification module containing a first value and a second value, the at least one memory device containing instructions for performing the method steps recited in claim 26.

28. A subscriber identification module for unlocking a telecommunications terminal for communicating over a network administrated by a network operator, the subscriber identification module comprising memory means readable by the telecommunications terminal, the memory means containing, alternatively instructions, instructions and data and data comprising a subscriber identification code and a codeword, the codeword being derivable by transforming the subscriber identification number according to a key that is a function of a key particular to the terminal and a modifier transmitted to the terminal by the network operator.

* * * * *